US006670317B2

(12) United States Patent
Severns et al.

(10) Patent No.: US 6,670,317 B2
(45) Date of Patent: Dec. 30, 2003

(54) FABRIC CARE COMPOSITIONS AND SYSTEMS FOR DELIVERING CLEAN, FRESH SCENT IN A LIPOPHILIC FLUID TREATMENT PROCESS

(75) Inventors: John Cort Severns, West Chester, OH (US); Toan Trinh, Maineville, OH (US); Robert Piller Fox, Hamilton, OH (US)

(73) Assignee: Procter & Gamble Company, Cincinnati, OH (US)

( * ) Notice: Subject to any disclaimer, the term of this patent is extended or adjusted under 35 U.S.C. 154(b) by 242 days.

(21) Appl. No.: 09/849,844

(22) Filed: May 4, 2001

(65) Prior Publication Data

US 2002/0013234 A1 Jan. 31, 2002

Related U.S. Application Data

(60) Provisional application No. 60/209,468, filed on Jun. 5, 2000, provisional application No. 60/209,250, filed on Jun. 5, 2000, provisional application No. 60/209,443, filed on Jun. 5, 2000, provisional application No. 60/209,444, filed on Jun. 5, 2000, and provisional application No. 60/247,135, filed on Nov. 9, 2000.

(51) Int. Cl.$^7$ .............................. C11D 3/43; C11D 3/50
(52) U.S. Cl. ............... 510/285; 510/101; 510/276; 510/286; 510/287; 510/288; 510/289; 510/290; 510/304; 510/466; 510/470; 510/471; 510/473
(58) Field of Search .................. 510/101, 276, 510/285, 286, 287, 288, 289, 290, 304, 466, 470, 471, 473

(56) References Cited

U.S. PATENT DOCUMENTS

| | | | |
|---|---|---|---|
| 3,635,667 A | 1/1972 | Keay et al. |
| 3,663,160 A | 5/1972 | Stone et al. |
| 3,854,871 A | 12/1974 | Eanzel et al. |
| 4,077,770 A | 3/1978 | Rouvellat et al. |
| 4,097,397 A | 6/1978 | Mizutani et al. |
| 4,102,824 A | 7/1978 | Mizutani et al. |
| 4,111,034 A | 9/1978 | Hubner |
| 4,137,044 A | 1/1979 | Flower et al. |
| 4,207,072 A | 6/1980 | Schuierer et al. |
| 4,267,077 A | 5/1981 | Niimi et al. |
| 4,639,321 A | 1/1987 | Barrat et al. |
| 4,685,930 A | 8/1987 | Kasprzak |
| 4,708,807 A | 11/1987 | Kemerer |
| 4,761,896 A | 8/1988 | Miyata |
| 4,909,962 A | 3/1990 | Clark |
| 5,037,485 A | 8/1991 | Chromecek et al. |
| 5,046,337 A | 9/1991 | Ro et al. |
| 5,057,240 A | 10/1991 | Madore et al. |
| 5,116,426 A | 5/1992 | Asano et al. |
| 5,271,775 A | 12/1993 | Asano et al. |
| 5,302,313 A | 4/1994 | Asano et al. |
| 5,360,571 A | 11/1994 | Kilgour et al. |
| 5,443,747 A | 8/1995 | Inada et al. |

(List continued on next page.)

FOREIGN PATENT DOCUMENTS

| | | | |
|---|---|---|---|
| CA | 1 239 326 | | 7/1988 |
| CN | 1069064 | * | 5/1993 |
| DE | 2108 991 | | 8/1972 |
| DE | 4131589 A1 | | 5/1986 |
| DE | 3739711 A | | 6/1989 |
| DE | 296 00 628 U1 | | 6/1997 |
| DE | 198 10907 A1 | | 9/1999 |
| EP | 1 451 600 A | | 10/1976 |
| EP | 1 509 315 | | 5/1978 |
| EP | 0 091 261 A2 | | 10/1983 |
| EP | 0 118 625 A2 | | 9/1984 |
| EP | 0182583 A2 | | 5/1986 |
| EP | 0410 068 A1 | | 1/1991 |
| EP | 0 422 787 A2 | | 4/1991 |
| EP | 0 566 240 A1 | | 10/1993 |
| EP | 0 679 754 A2 | | 11/1995 |
| EP | 0 716 870 A1 | | 6/1996 |
| EP | 0 479 146 B1 | | 12/1996 |
| EP | 0 767 267 A1 | | 4/1997 |
| EP | 0 962519 A1 | | 12/1999 |
| EP | 982 023 A2 | | 3/2000 |
| EP | 1 041 189 A1 | | 10/2000 |
| EP | 1 043 443 A1 | | 10/2000 |
| EP | 1 092 803 A1 | | 4/2001 |
| FR | 2 268 898 A1 | | 11/1975 |
| GB | 2 084 204 A | | 4/1982 |
| GB | 2 230 022 A | | 10/1990 |
| GB | 2 251 867 A | | 7/1992 |
| JP | 1098-798 A | | 4/1989 |
| JP | 1188-595 A | | 7/1989 |
| JP | 2166-198 A | | 6/1990 |
| JP | 2202-599 A | | 8/1990 |
| JP | 2222-496 A | | 9/1990 |
| JP | 3046-300 A | | 2/1991 |

(List continued on next page.)

OTHER PUBLICATIONS

US 6,001,133, 12/1999, DeYoung et al. (withdrawn)
XP 00218007, (Abstract).
XP 002180808, (Abstract Only).
XP 002180809, (Abstract Only).
XP 002180810, (Abstract Only).
Trilo et al.; "Critical Micelle Density for the Self–Assembly of Block Copolymer Surfactants in Supercritical Carbon Dioxide"; pp. 416–421.
Sarbu et al.; "Non–Fluorous Polymers With Very High Solubility in Supercritical $Co_2$ Down to Low Pressures"; pp. 165–168.

*Primary Examiner*—Charles Boyer
(74) *Attorney, Agent, or Firm*—Caroline Wei-Berk; Kim W. Zerby; Steve W. Miller

(57) ABSTRACT

Fabric care compositions comprising a perfume, methods for using such compositions and systems for their use in a lipophilic fluid treatment process are provided. More particularly, the present invention relates to fabric care compositions and systems comprising a perfume, and methods for using such compositions in the cleaning and treatment of garments with a lipophilic fluid.

44 Claims, No Drawings

U.S. PATENT DOCUMENTS

| | | | |
|---|---|---|---|
| 5,500,154 A | * 3/1996 | Bacon et al. ............... | 252/551 |
| 5,503,681 A | 4/1996 | Inada et al. | |
| 5,503,778 A | 4/1996 | Liu et al. | |
| 5,520,827 A | 5/1996 | Danner | |
| 5,593,507 A | 1/1997 | Inada et al. | |
| 5,597,792 A | 1/1997 | Klier et al. | |
| 5,628,833 A | 5/1997 | McCormack et al. | |
| 5,676,705 A | 10/1997 | Jureller et al. | |
| 5,683,473 A | 11/1997 | Jureller et al. | |
| 5,683,977 A | 11/1997 | Jureller et al. | |
| 5,690,750 A | 11/1997 | Inada et al. | |
| 5,705,562 A | 1/1998 | Hill | |
| 5,707,613 A | 1/1998 | Hill | |
| 5,716,456 A | 2/1998 | Inada et al. | |
| 5,722,781 A | 3/1998 | Yamaguchi | |
| 5,741,365 A | 4/1998 | Inada et al. | |
| 5,769,962 A | 6/1998 | Inada et al. | |
| 5,783,092 A | 7/1998 | Brown et al. | |
| 5,784,905 A | * 7/1998 | Townsend et al. ........... | 68/13 R |
| 5,811,383 A | 9/1998 | Klier et al. | |
| 5,858,022 A | 1/1999 | Romack et al. | |
| 5,865,852 A | 2/1999 | Berndt | |
| 5,866,005 A | 2/1999 | DeSimone et al. | |
| 5,876,510 A | 3/1999 | Kuemin et al. | |
| 5,877,133 A | 3/1999 | Good | |
| 5,888,250 A | 3/1999 | Hayday et al. | |
| 5,929,012 A | 7/1999 | Del Duca et al. | |
| 5,942,007 A | 8/1999 | Berndt et al. | |
| 5,944,996 A | 8/1999 | DeSimone et al. | |
| 5,954,869 A | 9/1999 | Elfersy et al. | |
| 5,977,040 A | 11/1999 | Inada et al. | |
| 5,977,045 A | 11/1999 | Murphy | |
| 5,985,810 A | 11/1999 | Inada et al. | |
| 6,013,683 A | 1/2000 | Hill et al. | |
| 6,042,617 A | 3/2000 | Berndt | |
| 6,042,618 A | 3/2000 | Berndt et al. | |
| 6,056,789 A | 5/2000 | Berndt et al. | |
| 6,059,845 A | 5/2000 | Berndt et al. | |
| 6,060,546 A | 5/2000 | Powell et al. | |
| 6,063,135 A | 5/2000 | Berndt et al. | |
| 6,086,635 A | 7/2000 | Berndt et al. | |
| 6,114,295 A | 9/2000 | Murphy | |
| 6,131,421 A | 10/2000 | Jureller et al. | |
| 6,136,766 A | 10/2000 | Inada et al. | |
| 6,148,644 A | 11/2000 | Jureller et al. | |
| 6,156,074 A | 12/2000 | Hayday et al. | |
| 6,177,399 B1 | 1/2001 | Mei et al. | |
| 6,200,352 B1 | 3/2001 | Romack et al. | |
| 6,200,393 B1 | 3/2001 | Romack et al. | |
| 6,200,943 B1 | 3/2001 | Romack et al. | |
| 6,204,233 B1 | 3/2001 | Smith et al. | |
| 6,228,826 B1 | 5/2001 | DeYoung et al. | |
| 6,242,408 B1 | 6/2001 | Elms et al. | |
| 6,258,130 B1 | 7/2001 | Murphy | |
| 6,273,919 B1 | 8/2001 | Hayday | |
| 6,309,425 B1 | 10/2001 | Murphy | |
| 6,310,029 B1 | 10/2001 | Kilgour et al. | |
| 6,313,079 B1 | * 11/2001 | Murphy .......................... | 3/28 |
| 6,368,359 B1 | 4/2002 | Perry et al. | |
| 2001/0020308 A1 | 9/2001 | Murphy | |
| 2001/0034912 A1 | 11/2001 | Kilgour et al. | |
| 2002/0004953 A1 | 1/2002 | Perry et al. | |
| 2002/0115582 A1 | 8/2002 | Perry et al. | |
| 2002/0174493 A1 | 11/2002 | Perry et al. | |

FOREIGN PATENT DOCUMENTS

| | | | |
|---|---|---|---|
| JP | 3063-799 A | | 3/1991 |
| JP | 4311799 | * | 4/1992 |
| JP | 04323299 A | | 11/1992 |
| JP | 05051598 A | | 3/1993 |
| JP | 05239766 A | | 9/1993 |
| JP | 08073837 A | | 3/1996 |
| JP | 09143497 A | | 6/1997 |
| JP | 10-017891 | | 1/1998 |
| JP | 11-092784 | | 4/1999 |
| JP | 11-323381 | | 11/1999 |
| JP | 11-323383 | | 11/1999 |
| JP | 00144175 A | | 5/2000 |
| JP | 2000-192085 | | 7/2000 |
| JP | 00290689 A | | 10/2000 |
| SU | 1705444 | * | 4/1992 |
| WO | WO 82/02218 A1 | | 7/1982 |
| WO | WO 94/01227 A1 | | 1/1994 |
| WO | WO 96/30471 A2 | | 10/1996 |
| WO | 96/30471 | * | 10/1996 |
| WO | WO 97/35061 A1 | | 9/1997 |
| WO | WO 98/07405 A1 | | 2/1998 |
| WO | 98/07405 | * | 2/1998 |
| WO | WO 98/16615 A1 | | 4/1998 |
| WO | WO 99/57358 | | 11/1999 |
| WO | WO 00/04221 | | 1/2000 |
| WO | WO 00/04222 | | 1/2000 |
| WO | WO 00/63340 | | 10/2000 |
| WO | WO 01/06051 A1 | | 1/2001 |
| WO | WO 01/34613 A1 | | 5/2001 |
| WO | WO 01/34706 A1 | | 5/2001 |
| WO | WO 01/40567 A1 | | 6/2001 |
| WO | WO 01/94678 A1 | | 12/2001 |
| WO | WO 01/94681 A1 | | 12/2001 |
| WO | WO 01/94684 A1 | | 12/2001 |

* cited by examiner

FABRIC CARE COMPOSITIONS AND SYSTEMS FOR DELIVERING CLEAN, FRESH SCENT IN A LIPOPHILIC FLUID TREATMENT PROCESS

RELATED APPLICATIONS

This application claims priority under 35 U.S.C. §119(e) to U.S. Provisional Application Ser. Nos. 60/209,468, 60/209,250, 60/209,443 and 60/209,444 all of which were filed on Jun. 5, 2000, and under 35 U.S.C. §119(e) to U.S. Provisional Application Ser. No. 60/247,135 filed on Nov. 9, 2000.

FIELD OF THE INVENTION

The present invention relates to fabric care compositions comprising a perfume, methods for using such compositions and systems for their use in a lipophilic fluid treatment process. More particularly, the present invention relates to fabric care compositions and systems comprising a perfume, and methods for using such compositions in the cleaning and treatment of garments with a lipophilic fluid.

BACKGROUND OF THE INVENTION

For centuries, fabric articles have been washed using water-based processes. In the last century, this home chore was greatly simplified by the development of the automatic washing machine. However, while greatly simplifying the home laundry process, even the home laundry process using the automatic washing machine still requires a significant amount of presorting fabric articles by color and textiles. Typically whites are washed separately from colored fabrics, and brightly colored fabric articles (e.g., dark reds and blues) from less highly colored articles. Further sorting and handling is required when the fabric articles to be laundered include "dry clean only" articles.

More recently, water conservation efforts and environmental concerns have driven laundry machine manufacturers and laundry detergent manufacturers to reduce the amount of water required in the home laundry process. However, such efforts have focused on reducing water consumption by the wash medium rather than changing the wash medium from a primarily water based process.

In parallel, concerns have arisen around the use of "Perc" (short for perchloroethylene) as the wash medium for the commercial dry cleaning process. These concerns have lead to the development of a significant number of proposed alternatives to the Perc-based processes, but to date all other alternatives are still not widely used. Examples include hydrocarbons and liquid carbon dioxide. A more recently proposed option as a replacement for Perc in the commercial dry cleaning field involves the use of siloxanes as the cleaning solution for "dry clean only" fabric articles (see, for example, U.S. Pat. Nos.: 5,942,007, Aug. 24, 1999; 6,042,617 and 6,042,618, both Mar. 28, 2000; 6,056,789, May 2, 2000; 6,059,845, May 9, 2000; and 6,063,135, May 16, 2000).

It has been discovered that further simplification of the automatic home laundry process and elimination of the reliance on a solely water based home laundry process are possible by using a lipophilic fluid-based wash medium for the home laundry process. This process allows not only the home cleaning of a consumer's "dry clean only" fabric articles, but also those "machine wash" articles conventionally washed at home in a water wash medium. Further while the consumer may still opt to wash such articles separately, the present invention process allows the consumer the freedom to significantly simplify the home laundry process by washing mixed loads of "dry clean only" and "machine wash" articles, thereby greatly reducing the presorting effort.

With such a dramatic change in the wash process comes the risk that the consumer's expectations, built up over generations of practicing the old water based system of laundering, will not be met—not because of cleaning performance deficiencies but due simply to the fact that the process looks so different.

Consumers, in general, have come to expect their clothes to smell "clean", which may mean having any number of perfume compositions delivered to the clothes during the wash process. However, delivery of perfumes to the lipophilic fluid systems useful for the new wash process, especially closed systems whereby the lipophilic fluid is recycled during the wash process and reused following a recovery process, creates a new world of problems and considerations for such a process.

Another risk associated with lipophilic fluid-based wash medium is the odor associated with lipophilic fluids. Lipophilic fluids usually contain significant levels of offensive odor contaminants.

Accordingly, there is a need for fabric care compositions and systems that comprise a perfume composition wherein the perfume composition can mask and/or deodorize the fabric care composition and/or the perfume composition can be delivered to a fabric during a lipophilic fluid-based wash process; and methods employing such compositions and/or systems for treating fabrics in need of treatment.

SUMMARY OF THE INVENTION

The present invention fulfills the needs identified above by providing a composition and/or system comprising perfume composition for use in a lipophilic fluid fabric treatment system.

In one aspect of the present invention, a fabric care composition comprising:
  a) a lipophilic fluid; and
  b) a perfume composition, preferably comprising a lasting perfume ingredient selected from the group consisting of enduring perfume ingredients, low odor detection threshold perfume ingredients, and mixes thereof;

In another aspect of the present invention, a fabric care composition comprising:
  a) a lipophilic fluid; and
  b) a perfume composition, preferably comprising a lasting perfume ingredient selected from the group consisting of enduring perfume ingredients, low odor detection threshold perfume ingredients, and mixes thereof;
  c) an emulsifier; and
  d) water, is provided.

In another preferred embodiment, a fabric care composition comprising a perfume composition, preferably comprising a lasting perfume ingredient selected from the group consisting of enduring perfume ingredients, low odor detection threshold perfume ingredients and mixtures thereof, is sprayed onto a fabric article in liquid form using the lipophilic fluid as the carrier vehicle.

In another preferred embodiment, a fabric care composition comprising a perfume composition, preferably comprising a lasting perfume ingredient selected from the group consisting of enduring perfume ingredients, low odor detection threshold perfume ingredients and mixtures thereof, is applied to a fabric article by way of a vapor phase, preferably by spraying or misting onto the fabric article via a nozzle sprayer.

In yet another preferred embodiment, a fabric care composition comprising a perfume composition, preferably comprising a lasting perfume ingredient selected from the group consisting of enduring perfume ingredients, low odor detection threshold perfume ingredients and mixtures thereof, wherein the composition is in a form, preferably a gel-matrix form or an impregnated sheet form, such that the perfume composition is applied to a fabric article when the composition is placed in a stream of impinging gas, preferably heated gas, preferably air, such as air used for drying the fabric article. In other words, the perfume composition is transferred to the fabric article via the gas during for example a drying cycle for the fabric article.

In yet another aspect of the present invention, a method for treating a fabric in need of treatment comprising contacting said fabric with a fabric care composition according to the present invention, is provided.

In still yet another aspect of the present invention, a method for delivering a perfume composition to a fabric comprising contacting said fabric with a fabric care composition according to present invention such that said perfume composition is delivered to said fabric.

In even yet another aspect of the present invention, a fabric treated by the method according to the present invention is provided.

Still another aspect of the present invention, a perfumed fabric produced by the method according to the present invention is provided.

Yet another aspect of the present invention, a perfume delivery system comprising:
 a) a lipophilic fluid; and
 b) a perfume composition, preferably comprising a lasting perfume ingredient selected from the group consisting of enduring perfume ingredients, low odor detection threshold perfume ingredients and mixtures thereof;
  wherein said perfume composition is delivered to a fabric upon contacting said fabric, is provided.

Still yet another aspect of the present invention, an article of manufacture comprising a fabric care composition according to the present invention packaged in association with instructions for using said fabric care composition for treating a fabric in need of treatment comprising the step of contacting said fabric with said fabric care composition, is provided.

The contacting of the fabric article by the perfume composition and optionally, the lipophilic fluid preferably occurs within one apparatus comprising the fabric article to be treated.

Accordingly, the present invention provides compositions and/or systems comprising a perfume, methods for using the compositions, and an article of manufacture comprising the composition.

DETAILED DESCRIPTION OF THE INVENTION

The term "fabrics" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

Preferably said fabrics are made of fibers selected from the group consisting of natural fibers, synthetic fibers, and mixtures thereof. More preferably, said fabric is made of fibers selected from the group consisting of: cellulosic fibers, proteinaceous fibers, synthetic fibers, long vegetable fibers and mixtures thereof.

Preferably the cellulosic fibers are selected from the group consisting of cotton, rayon, linen, Tencel®, poly/cotton and mixtures thereof.

Tencel® is a cellulosic fiber made from wood pulp from trees grown on special tree farms in the U.S.A. where the trees are constantly replanted. The fiber is produced via a special "solvent-spinning" process using a non-toxic solvent that is 99% recoverable and recyclable. Because no toxic chemical products are produced during the process, there are no harmful fumes released into the atmosphere. Tencel® has all the characteristics of a luxury fiber: the natural, workable comfort of cotton, the fluid drape and color richness of rayon, the strength of a synthetic and the luxurious hand and luster of silk. Fabrics of Tencel® have exceptional strength, a luxurious hand and fluid drape, are naturally absorbent and comfortable, and accept dyes readily, from pale pastels to rich jewel tones. They also resist wrinkling and shrinkage and are often washable. Tencel® can be combined with other fibers—Tencel® enhances their best attributes. For example, one can combine with linen, rayon, lycra, micro denier polyester and cotton. Tencel®'s high strength enables the production of finer count. Tencel® is commercially available from Courtaulds Fibers, Inc.

Preferably the proteinaceous fibers are selected from the group consisting of silk, wool and related mammalian fibers and mixtures thereof. Preferably the synthetic fibers are selected from the groups consisting of polyester, acrylic, nylon and mixtures thereof. Preferably the long vegetable fibers are selected from the group consisting of jute, flax, ramie, coir, kapok, sisal, henequen, abaca, hemp, sunn and mixtures thereof. yarns—providing a finer, softer and less wrinkled fabric.

The term "lipophilic fluid" used herein is intended to mean any non-aqueous fluid capable of removing sebum, as qualified by the test described below.

Furthermore, optional adjunct ingredients such as surfactants, bleaches, and the like may be added either prior to fabric application (directly into the lipophilic fluid and/or water) or at some point during fabric application. These optional adjunct ingredients are also described in more detail below.

The term "wash medium", as used herein, means the liquid [including but not limited to, fluid(s) and/or solution(s) and/or solvent(s) and/or emulsion(s)] which is used to wet the fabric articles in the wash load during the automatic home laundry process.

The terms "siloxane" as used herein, means silicone fluids which are non-polar and insoluble in water or lower alcohols. They are completely miscible in typical aliphatic and aromatic solvents, including the halogenated solvents, but are only partially miscible with the intermediate petrolium fractions such as naphthalenes. Linear siloxanes (see for example U.S. Pat. Nos. 5,443,747, and 5,977,040, both incorporated herein by reference in their entirety) and cyclic siloxanes are useful herein, including the cyclic siloxanes selected from the group consisting of octamethylcyclotetrasiloxane (tetramer), dodecamethylcyclohexasiloxane (hexamer), and preferably decamethylcyclopentasiloxane (pentamer, commonly referred to as "D5"). Most preferred are wash mediums wherein the siloxane comprises more than about 50% cyclic siloxane pentamer, more preferably more than about 75%, most preferably at least about 90% of the pentamer. Also preferred are wash mediums comprising siloxanes which are a mixture of cyclic siloxanes having at least about 90% (preferably at least about 95%) pentamer and less than about 10% (preferably less than about 5%) tetramer and/or hexamer.

The term "system" as used herein means a complex unity formed of many often, but not always, diverse parts (i.e., materials, compositions, devices, appliances, procedures, methods, conditions, etc.) subject to a common plan or serving a common purpose.

The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Test Protocol for Measuring the Absorption Capacity of a Fabric Article

Step 1: Rinse and dry a reservoir or other container into which a lipophilic fluid will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2 L of a lipophilic fluid at ~20 C. into the reservoir.

Step 4: Place fabric article from Step 2 into the lipophilic fluid-containing reservoir.

Step 5: Agitate the fabric article within the reservoir to ensure no air pockets are left inside the fabric article and it is thoroughly wetted with the lipophilic fluid.

Step 6: Remove the fabric article from the lipophilic fluid-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of lipophilic fluid absorbed for the fabric article using the equation below.

$$FA=(W-D)/D*100$$

where:
FA=fluid absorbed, % (i.e., the absorption capacity of the fabric article in terms of % by dry weight of the fabric article)
W=wet specimen weight, g
D=initial specimen weight, g By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immersive process when the following Test Protocol is satisfied.

Test Protocol for Non-Immersive Processes

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA=(W-D)/D*100$$

where:
FA=fluid absorbed, %
W=wet specimen weight, g
D=initial specimen weight, g Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

Fabric Care Composition

The fabric care composition and/or system of the present invention comprises a perfume composition, preferably comprising a lasting perfume ingredient selected from the group consisting of enduring perfume ingredients, low odor detection threshold perfume ingredients and mixtures thereof.

The perfume composition of the present invention preferably comprises perfume ingredients that are not typical laundry perfumes that typically avoid hydrophilic ingredients.

The fabric care composition and/or system of the present invention preferably comprises at least about 50%, more preferably from about 50% to about 100% by weight of the composition of the lipophilic fluid, when lipohilic fluid is a component of the composition.

The perfume components of the perfume-containing fabric care composition and/or system of the present invention preferably comprises from about 0.1% to about 25%, more preferably from about 0.2% to about 10%, even more preferably from about 0.3% to about 5%, most preferably from about 0.4% to about 2% by weight of the fabric care composition.

The perfume composition according to the present invention preferably comprises at least about 25%, more preferably at least about 40%, even more preferably at least about 60%, most preferably at least about 75% by weight of the perfume composition of the lasting perfume ingredient.

The fabric care composition and/or system of the present invention preferably comprises water; more preferably water and an emulsifier.

When water is present in said fabric care composition, the water is preferably present at a level of less than about 50%, more preferably from about 0.1% to about 50% by weight of the composition.

The fabric care composition is preferably in the form of a liquid, and is preferably applied to fabrics by spraying the fabric care composition onto the fabrics to be treated.

Lipophilic Fluid

The lipophilic fluid herein is one having a liquid phase present under operating conditions. In general such a fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipohilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines while unsuitable for use as lipohilic fluid may be present as one of many possible adjuncts present in the lipohilic fluid. Other suitable lipohilic fluids include diol solvent systems e.g., higher diols such as C6- or C8- or higher diols; organosilicon solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Depending on the nature of treatment the lipophilic fluid may be removed mechanically, evaporatively, or any combination thereof. For example, if the purpose of the treatment is to provide cleaning it will be desirable to mechanically remove from the fabric articles at least 50% of the textile treatment liquid, for example by spinning. On the other hand, if the purpose of the treatment is to deposit a conditioning agent into the fabric, the liquid is preferably removed evaporatively.

Qualification of Lipophilic Fluid—Lipophilic Fluid Test (LF Test)

Any non-aqueous fluid that is both capable of meeting known requirements for a dry-cleaning fluid (e.g, flash point etc.) and is capable of at least partially dissolving sebum, as indicated by the test method described below, is suitable as a lipophilic fluid herein. The ability of a particular material to remove sebum can be measured by any known technique.

As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat #1221131. The GC is suitably operated under the following conditions:

| Carrier Gas: | Hydrogen |
|---|---|
| Column Head Pressure: | 9 psi |
| Flows: | Column Flow @ ~1.5 ml/min. |
| | Split Vent @ ~250–500 ml/min. |
| | Septum Purge @ 1 ml/min. |
| Injection: | HP 7673 Autosampler, 10 ul syringe, 1 ul injection |
| Injector Temperature: | 350° C. |
| Detector Temperature: | 380° C. |
| Oven Temperature Program: | initial 60° C., hold 1 min. |
| | rate 25° C./min. |
| | final 380° C. hold 30 min. |

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid for use in the lipophilic fluid can be present in a mixture, e.g., with water, at approximately the ratio to be used in the final lipophilic fluid which will come into contact with fabric articles. Certain materials, which remove sebum, qualify for use as lipophilic fluids; for example, ethyl lactates can be quite objectionable in their tendency to dissolve buttons, and if such a material is to be used in the lipophilic fluid, it will be formulated with water and/or other solvents such that the overall mix is not substantially damaging to buttons. Other lipophilic fluids, D5 for example, meets the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135, which are herein incorporated by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Perfume

The fabric care compositions of the present invention can comprise perfume to provide a "scent signal" in the form of a pleasant odor which provides a clean and/or freshness impression to the washed fabrics. Any type of perfume can be incorporated into the composition of the present invention. Nonlimiting examples of such perfume agents include aromatic and aliphatic esters, aliphatic and aromatic alcohols, aliphatic ketones, aromatic ketones, aliphatic lactones, aliphatic aldehydes, aromatic aldehydes, condensation products of aldehydes and amines, saturated alcohols, saturated esters, saturated aromatic ketones, saturated lactones, saturated nitriles, saturated ethers, saturated acetals, saturated phenols, saturated hydrocarbons, aromatic nitromusks and mixtures thereof, as more fully described in U.S. Pat. No. 5,939,060 and Canadian Patent No. 1,325,601. Other perfume agents are described in U.S. Pat. Nos. 5,744,435 and 5,721,202, all of said patents are incorporated by reference.

It will be appreciated that present invention relates to solvent-based compositions and/or substantially non-aqueous laundry cleaning methods and/or apparatuses. The perfume behavior in these non-aqueous media is different from perfume behavior in the conventional washing conditions with water. In conventional laundry cleaning using water, perfume ingredients that have high water affinity are not preferred because they are not fabric substantive, and are lost with the rinse water, as taught in U.S. Pat. No. 5,780,404, said patent being incorporated by reference. The solvents in the compositions have the tendency to retain all perfume ingredients and prevent the perfume from depositing on the fabrics. Therefore it is essential to select the perfume ingredients that can effectively provide the best residual perfume odor benefit on fabrics. It is preferable that at least about 25%, preferably at least about 40%, more preferably at least about 60%, and even more preferably at least about 75%, by weight of the perfume is composed of those "lasting" perfume ingredients, selected from the group consisting of "enduring" perfume ingredients that appreciably remain on fabrics after drying, perfume ingredients having low odor detection threshold and mixtures thereof.

a. Enduring Perfume Ingredients

The enduring perfume ingredients are characterized by their boiling points (B.P.). The enduring perfume ingredients of this invention have a B.P, measured at the normal, standard pressure of 760 mm Hg, of about 240° C. or higher, and preferably of about 250° C. or higher.

The boiling points of many perfume ingredients are given in, e.g., "Perfume and Flavor Chemicals (Aroma Chemicals)," Steffen Arctander, published by the author, 1969, incorporated herein by reference. Other boiling point values can be obtained from different chemistry handbooks and data bases, such as the Beilstein Handbook, Lange's Handbook of Chemistry, and the CRC Handbook of Chemistry and Physics. When a boiling point is given only at a different pressure, usually lower pressure than the normal pressure of 760 mm Hg, the boiling point at normal pressure can be approximately estimated by using boiling point-pressure nomographs, such as those given in "The Chemist's Companion," A. J. Gordon and R. A. Ford, John Wiley & Sons Publishers, 1972, pp. 30–36. The boiling point values can also be estimated via a computer program that is described in "Development of a Quantitative Structure—Property Relationship Model for Estimating Normal Boiling Points of Small Multifunctional Organic Molecules", David T. Stanton, Journal of Chemical Information and Computer Sciences, Vol. 40, No. 1, 2000, pp. 81–90, incorporated herein by reference. Thus, when a perfume composition which is composed of enduring perfume ingredients having a B.P. of about 250° C. or higher, they remain substantive on fabrics after the drying step.

Non-limiting examples of the preferred enduring perfume ingredients of the present invention include: allyl cyclohexane propionate, ambrettolide, amyl benzoate, amyl cinnamate, amyl cinnamic aldehyde, amyl cinnamic aldehyde dimethyl acetal, iso-amyl salicylate, aurantiol (trade name for hydroxycitronellal-methyl anthranilate), benzophenone, benzyl salicylate, isobutyl quinoline, beta-caryophyllene, cadinene, cedrol, cedryl acetate, cedryl formate, cinnamyl cinnamate, cyclohexyl salicylate, cyclamen aldehyde, dihydro isojasmonate, diphenyl methane, diphenyl oxide, dodecalactone, iso E super (trade name for 1-(1,2,3,4,5,6,7,8-octahydro-2,3,8,8-tetramethyl-2-naphthalenyl)-ethanone), ethylene brassylate, ethyl methyl phenyl glycidate, ethyl undecylenate, iso-eugenol, exaltolide (trade name for 15-hydroxypentadecanoic acid, lactone), galaxolide (trade name for 1,3,4,6,7,8-hexahydro-4,6,6,7,8,8-hexamethylcyclopenta-gamma-2-benzopyran), geranyl anthranilate, hexadecanolide, hexenyl salicylate, hexyl cinnamic aldehyde, hexyl salicylate, lilial (trade name for para-tertiary-butyl-alpha-methyl hydrocinnamic aldehyde), linalyl benzoate, 2-methoxy naphthalene, methyl cinnamate, methyl dihydrojasmonate, beta-methyl naphthyl ketone, musk indanone, musk ketone, musk tibetine, myristicin, delta-nonalactone, oxahexadecanolide-10, oxahexadecanolide-11, patchouli alcohol, phantolide (trade name for 5-acetyl-1,1,2,3,3,6-hexamethylindan), phenyl ethyl benzoate, phenylethylphenylacetate, phenyl heptanol, phenyl hexanol, alpha-santalol, thibetolide (trade name for 15-hydroxypentadecanoic acid, lactone), tonalid, delta-undecalactone, gamma-undecalactone, vetiveryl acetate, yara-yara, allyl phenoxy acetate, cinnamic alcohol, cinnamic aldehyde, cinnamyl formate, coumarin, dimethyl benzyl carbinyl acetate, ethyl cinnamate, ethyl vanillin (3-methoxy-4-ethoxy benzaldehyde), eugenol, eugenyl acetate, heliotropine, indol, isoeugenol, koavone, methyl-beta-naphthyl ketone, methyl cinnamate, methyl dihdrojasmonate, beta methyl naphthyl ketone, methyl-n-methyl anthranilate, delta-nonalactone, gamma-nonalactone, para methoxy acetophenone (acetanisole), phenoxy ethyl iso butyrate, phenoxy ethyl propionate, piperonal, triethyl citrate, vanillin, and mixtures thereof.

Other enduring perfume ingredients useful in the present invention include methyl-N-methyl anthranilate, benzyl butyrate, benzyl iso valerate, citronellyl isobutyrate, citronellyl propionate, delta-nonalactone, dimethyl benzyl carbinyl acetate, dodecanal, geranyl acetate, geranyl isobutyrate, gamma-ionone, para-isopropyl phenylacetaldehyde, cis-jasmone, methyl eugenol, hydroxycitronellal, phenoxy ethanol, benzyl iso valerate, anisic aldehyde, cuminic alcohol, cis-jasmone, methyl eugenol, and mixtures thereof.

The preferred perfume compositions used in the present invention contain at least 4 different enduring perfume ingredients, preferably at least 5 enduring perfume ingredients, more preferably at least 6 different enduring perfume ingredients, and even more preferably at least 7 different enduring perfume ingredients. Most common perfume ingredients which are derived from natural sources are composed of a multitude of components. When each such material is used in the formulation of the preferred perfume compositions of the present invention, it is counted as one single ingredient, for the purpose of defining the invention.

In the perfume art, some materials having no odor or very faint odor are used as diluents or extenders. Non-limiting examples of these materials are dipropylene glycol, diethyl phthalate, triethyl citrate, isopropyl myristate, and benzyl benzoate. These materials are used for, e.g., diluting and stabilizing some other perfume ingredients. These materials are not counted in the formulation of the lasting perfume compositions of the present invention.

b. Low Odor Detection Threshold Perfume Ingredients

The perfume compositions of the present invention can comprise one or more low odor detection threshold perfume ingredients. The odor detection threshold of an odorous material is the lowest vapor concentration of that material which can be olfactorily detected. The odor detection threshold and some odor detection threshold values are discussed in, e.g., "Standardized Human Olfactory Thresholds", M. Devos et al, IRL Press at Oxford University Press, 1990, and "Compilation of Odor and Taste Threshold Values Data", F. A. Fazzalari, editor, ASTM Data Series DS 48A, American Society for Testing and Materials, 1978, both of said publications being incorporated by reference. The use of small amounts of perfume ingredients that have low odor detection threshold values can improve perfume odor character, even though they are not as substantive as the enduring perfume ingredients disclosed hereinabove. Perfume ingredients having a significantly low detection threshold, useful in the lasting perfume composition of the present invention, are selected from the group consisting of allyl amyl glycolate, ambrox, anethole, bacdanol, benzyl acetone, benzyl salicylate, butyl anthranilate, calone, cetalox, cinnamic alcohol, coumarin, cyclogalbanate, Cyclal C, cymal, damascenone, alpha-damascone, 4-decenal, dihydro isojasmonate, gamma-dodecalactone, ebanol, ethyl anthranilate, ethyl-2-methyl butyrate, ethyl methylphenyl glycidate, ethyl vanillin, eugenol, flor acetate, florhydral, fructone, frutene, heliotropin, herbavert, cis-3-hexenyl salicylate, indole, alpha-ionone, beta-ionone, iso cyclo citral, isoeugenol, alpha-isomethylionone, keone, lilial, linalool, lyral, methyl anthranilate, methyl dihydrojasmonate, methyl heptine carbonate, methyl isobutenyl tetrahydropyran, methyl beta naphthyl ketone, methyl nonyl ketone, beta naphthol methyl ether, nerol, para-anisic aldehyde, para hydroxy phenyl butanone, phenyl acetaldehyde, gamma-undecalactone, undecylenic aldehyde and mixtures thereof. These materials are preferably present at low levels in addition to the enduring perfume ingredients, typically less than about 20%, preferably less than about 15%, more preferably less than about 10%, by weight of the total perfume compositions of the present invention. However, only low levels are required to provide a perfume odor effect. Some enduring perfume ingredients also have low odor detection threshold. These materials are counted as enduring perfume ingredients in the formulation of the lasting perfume compositions of the present invention Because of the presence of high levels of solvents and a relatively poor delivery of perfume to fabric, the fabric care compositions of the current invention can comprise relatively high levels of perfume, typically from about 0.01% to about 5%, preferably from about 0.1% to about 4%, more preferably from about 0.3% to about 3%, and even more preferably from about 0.4% to about 2%, by weight of the detergent composition.

The present invention also relates to non-aqueous cleaning methods comprising a "final" treatment to provide a fabric freshening benefit. The fabric care compositions in accordance with the present invention that are especially suitable in this method preferably comprise a lipophilic fluid and a perfume composition, preferably comprising a lasting perfume ingredient selected from the group consisting of enduring perfume ingredients, low odor detection threshold perfume ingredients and mixtures thereof. The level of perfume in the fabric care composition is typically from about 0.0001% to about 0.2%, preferably from about 0.0002% to about 0.1%, more preferably from about 0.003% to about 0.08%, most preferably from about 0.005% to about 0.05% by weight of the composition of the perfume composition.

Sustained Perfume Release Agents
Pro-fragrances, Pro-perfumes, and Pro-accords The fabric care compositions of the present invention may also comprise a fragrance delivery system comprising one or more pro-fragrances, pro-perfumes, pro-accords, and mixtures thereof hereinafter known collectively as "pro-fragrances". The pro-fragrances of the present invention can exhibit varying release rates depending upon the pro-fragrance chosen. In addition, the pro-fragrances of the present invention can be admixed with the fragrance raw materials which are released therefrom to present the user with an initial fragrance, scent, accord, or bouquet.

The pro-fragrances of the present invention can be suitably admixed with any carrier provided the carrier does not catalyze or in other way promote the pre-mature release form the pro-fragrance of the fragrance raw materials.

The following are non-limiting classes of pro-fragrances according to the present invention.

Esters and Polyesters

The esters and polyester pro-fragrances of the present invention are capable of releasing one or more fragrance raw material alcohols. Preferred are esters having the formula:

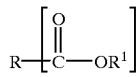

wherein R is substituted or unsubstituted $C_1$–$C_{30}$ alkylene, $C_2$–$C_{30}$ alkenylene, $C_6$–$C_{30}$ arylene, and mixtures thereof; —$OR^1$ is derived from a fragrance raw material alcohol having the formula $HOR^1$, or alternatively, in the case wherein the index x is greater than 1, $R^1$ is hydrogen thereby rendering at least one moiety a carboxylic acid, —$CO_2H$ unit, rather than an ester unit; the index x is 1 or greater. Non-limiting examples of preferred polyester pro-fragrances include digeranyl succinate, dicitronellyl succinate, digeranyl adipate, dicitronellyl adipate, and the like.

Beta-ketoesters

The b-ketoesters of the present invention are capable of releasing one or more fragrance raw materials. Preferred b-ketoesters according to the present invention have the formula:

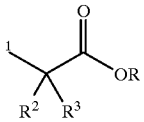

wherein —OR derives from a fragrance raw material alcohol; $R^1$, $R^2$, and $R^3$ are each independently hydrogen, $C_1$–$C_{30}$ alkyl, $C_2$–$C_{30}$ alkenyl, $C_1$–$C_{30}$ cycloalkyl, $C_2$–$C_{30}$ alkynyl $C_6$–$C_{30}$ aryl, $C_7$–$C_{30}$ alkylenearyl, $C_3$–$C_{30}$ alkyleneoxyalkyl, and mixtures thereof, provided at least one $R^1$, $R^2$, or $R^3$ is a unit having the formula:

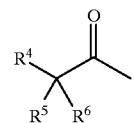

wherein $R^4$, $R^5$, and $R^6$ are each independently hydrogen, $C_1$–$C_{30}$ alkyl, $C_2$–$C_{30}$ alkenyl, $C_1$–$C_{30}$ cycloalkyl, $C_1$–$C_{30}$ alkoxy, $C_6$–$C_{30}$ aryl, $C_7$–$C_{30}$ alkylenearyl, $C_3$–$C_{30}$ alkyleneoxyal and mixtures thereof, or $R^4$, $R^5$, and $R^6$ can be taken together to form a $C_3$–$C_8$ aromatic or non-aromatic, heterocyclic or non-heterocyclic ring.

Non-limiting examples of b-ketoesters according to the present invention include 2,6-dimethyl-7-octen-2-yl 3-(4-methoxyphenyl)-3-oxo-propionate; 3,7-dimethyl-1,6-octadien-3-yl 3-(nonanyl)-3-oxo-propionate; 9-decen-1-yl 3-(b-naphthyl)-3-oxo-propionate; (a,a-4-trimethyl-3-cyclohexenyl)methyl 3-(b-naphthyl)-3-oxo-propionate; 3,7-dimethyl-1,6-octadien-3-yl 3-(4-methoxyphenyl)-3-oxo-propionate; 2,6-dimethyl-7-octen-2-yl 3-(b-naphthyl)-3-oxo-propionate; 2,6-dimethyl-7-octen-2-yl 3-(4-nitrophenyl)-3-oxo-propionate; 2,6-dimethyl-7-octen-2-yl 3-(4-methoxyphenyl)-3-oxo-propionate; 3,7-dimethyl-1,6-octadien-3-yl 3-(a-naphthyl)-3-oxo-propionate; cis 3-hexen-1-yl 3-(b-naphthyl)-3-oxo-propionate; 2,6-dimethyl-7-octen-2-yl 3-(nonanyl)-3-oxo-propionate; 2,6-dimethyl-7-octen-2-yl 3-oxo-butyrate; 3,7-dimethyl-1,6-octadien-3-yl 3-oxo-butyrate; 2,6-dimethyl-7-octen-2-yl 3-(b-naphthyl)-3-oxo-2-methylpropionate; 3,7-dimethyl-1,6-octadien-3-yl 3-(b-naphthyl)-3-oxo-2,2-dimethylpropionate; 3,7-dimethyl-1,6-octadien-3-yl 3-(b-naphthyl)-3-oxo-2-methylpropionate; 3,7-dimethyl-2,6-octadienyl 3-(b-naphthyl)-3-oxo-propionate; 3,7-dimethyl-2,6-octadienyl 3-heptyl-3-oxo-propionate.

Acetals and Ketals

Another class of compound useful as pro-accords according to the present invention are acetals and ketals having the formula:

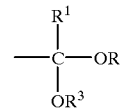

wherein hydrolysis of the acetal or ketal releases one equivalent of aldehyde or ketone and two equivalents of alcohol according to the following scheme:

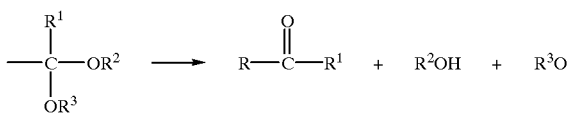

wherein R is $C_1$–$C_{20}$ linear alkyl, $C_4$–$C_{20}$ branched alkyl, $C_6$–$C_{20}$ cyclic alkyl, $C_6$–$C_{20}$ branched cyclic alkyl, $C_6$–$C_{20}$ linear alkenyl, $C_6$–$C_{20}$ branched alkenyl, $C_6$–$C_{20}$ cyclic alkenyl, $C_6$–$C_{20}$ branched cyclic alkenyl, $C_6$–$C_{20}$ substituted or unsubstituted aryl, preferably the moieties which substitute the aryl units are alkyl moieties, and mixtures thereof. $R^1$ is hydrogen, R, or in the case wherein the pro-accord is a ketal, R and $R^1$ can be taken together to form a ring. $R^2$ and $R^3$ are independently selected from the group consisting of $C_5$–$C_{20}$ linear, branched, or substituted alkyl; $C_4$–$C_{20}$ linear, branched, or substituted alkenyl; $C_5$–$C_{20}$ substituted or unsubstituted cyclic alkyl; $C_5$–$C_{20}$ substituted or unsubstituted aryl, $C_2$–$C_{40}$ substituted or unsubstituted alkyleneoxy; $C_3$–$C_{40}$ substituted or unsubstituted alkyleneoxyalkyl; $C_6$–$C_{40}$ substituted or unsubstituted alkylenearyl; $C_6$–$C_{32}$ substituted or unsubstituted aryloxy; $C_6$–$C_{40}$ substituted or unsubstituted alkyleneoxyaryl; $C_6$–$C_{40}$ oxyalkylenearyl; and mixtures thereof.

Non-limiting examples of aldehydes which are releasable by the acetals of the present invention include 4-(4-hydroxy-4-methylpentyl)-3-cyclohexene-1-carboxaldehyde (lyral), phenylacetaldehyde, methylnonyl acetaldehyde, 2-phenylpropan-1-al (hydrotropaldehyde), 3-phenylprop-2- en-1-al (cinnamaldehyde), 3-phenyl-2-pentylprop-2-en-1-al (a-amylcinnamaldehyde), 3-phenyl-2-hexylprop-2-enal (a-hexylcinnamaldehyde), 3-(4-isopropylphenyl)-2-methylpropan-1-al (cyclamen aldehyde), 3-(4-ethylphenyl)-2,2-dimethylpropan-1-al (floralozone), 3-(4-tert-butylphenyl)-2-methylpropanal, 3-(3,4-methylenedioxyphenyl)-2-methylpropan-1-al (helional), 3-(4-ethylphenyl)-2,2-dimethylpropanal, 3-(3-isopropylphenyl)butan-1-al (florhydral), 2,6-dimethylhep-5-en-1-al (melonal), n-decanal, n-undecanal, n-dodecanal, 3,7-dimethyl-2,6-octadien-1-al (citral), 4-methoxybenzaldehyde (anisaldehyde), 3-methoxy-4-hydroxybenzaldehyde (vanillin), 3-ethoxy-4-hydroxybenzaldehyde (ethyl vanillin), 3,4-methylenedioxybenzaldehyde (heliotropin), 3,4-dimethoxybenzaldehyde.

Non-limiting examples of ketones which are releasable by the ketals of the present invention include a-damascone, b-damascone, d-damascone, b-damascenone, muscone, 6,7-dihydro-1,1,2,3,3-pentamethyl-4(5H)-indanone (cashmeran), cis-jasmone, dihydrojasmone, a-ionone, b-ionone, dihydro-b-ionone, g-methyl ionone, a-iso-methyl ionone, 4-(3,4-methylenedioxyphenyl)butan-2-one, 4-(4-hydroxyphenyl)butan-2-one, methyl b-naphthyl ketone, methyl cedryl ketone, 6-acetyl-1,1,2,4,4,7-hexamethyltetralin (tonalid), l-carvone, 5-cyclohexadecen-1-one, acetophenone, decatone, 2-[2-(4-methyl-3-cyclohexenyl-1-yl)propyl]cyclopentan-2-one, 2-sec-butylcyclohexanone, b-dihydro ionone, allyl ionone, a-irone, a-cetone, a-irisone, acetanisole, geranyl acetone, 1-(2-methyl-5-isopropyl-2-cyclohexenyl)-1propanone, acetyl diisoamylene, methyl cyclocitrone, 4-t-pentyl cyclohexanone, p-t-butylcyclohexanone, o-t-butylcyclohexanone, ethyl amyl ketone, ethyl pentyl ketone, menthone, methyl-7,3-dihydro-2H-1,5-benzodioxepine-3-one, fenchone.

Orthoesters

Another class of compound useful as pro-accords according to the present invention are orthoesters having the formula:

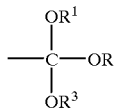

wherein hydrolysis of the orthoester releases one equivalent of an ester and two equivalents of alcohol according to the following scheme:

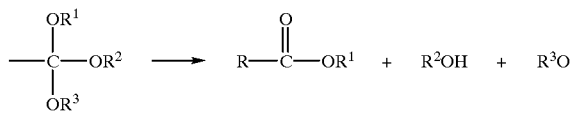

wherein R is hydrogen, $C_1-C_{20}$ alkyl, $C_4-C_{20}$ cycloalkyl, $C_6-C_{20}$ alkenyl, $C_6-C_{20}$ aryl, and mixtures thereof; $R^1$, $R^2$ and $R^3$ are each independently selected from the group consisting of $C_5-C_{20}$ linear, branched, or substituted alkyl; $C_4-C_{20}$ linear, branched, or substituted alkenyl; $C_5-C_{20}$ substituted or unsubstituted cyclic alkyl; $C_5-C_{20}$ substituted or unsubstituted aryl, $C_2-C_{40}$ substituted or unsubstituted alkyleneoxy; $C_3-C_{40}$ substituted or unsubstituted alkyleneoxyalkyl; $C_6-C_{40}$ substituted or unsubstituted alkylenearyl; $C_6-C_{32}$ substituted or unsubstituted aryloxy; $C_6-C_{40}$ substituted or unsubstituted alkyleneoxyaryl; $C_6-C_{40}$ oxyalkylenearyl; and mixtures thereof.

Non-limiting examples of orthoester pro-fragrances include tris-geranyl orthoformate, tris(cis-3-hexen-1-yl) orthoformate, tris(phenylethyl) orthoformate, bis (citronellyl) ethyl orthoacetate, tris(citronellyl) orthoformate, tris(cis-6-nonenyl) orthoformate, tris (phenoxyethyl) orthoformate, tris(geranyl, neryl) orthoformate (70:30 geranyl:neryl), tris(9-decenyl) orthoformate, tris(3-methyl-5-phenylpentanyl) orthoformate, tris(6-methylheptan-2-yl) orthoformate, tris([4-(2,2,6-trimethyl-2-cyclohexen-1-yl)-3-buten-2-yl] orthoformate, tris[3-methyl-5-(2,2,3-trimethyl-3-cyclopenten-1-yl)-4-penten-2-yl] orthoformate, trismenthyl orthoformate, tris(4-isopropylcyclohexylethyl-2-yl) orthoformate, tris-(6,8-dimethylnonan-2-yl) orthoformate, tris-phenylethyl orthoacetate, tris(cis-3-hexen-1-yl) orthoacetate, tris(cis-6-nonenyl) orthoacetate, tris-citronellyl orthoacetate, bis (geranyl) benzyl orthoacetate, tris(geranyl) orthoacetate, tris (4-isopropylcyclohexylmethyl) orthoacetate, tris(benzyl) orthoacetate, tris(2,6-dimethyl-5-heptenyl) orthoacetate, bis (cis-3-hexen-1-yl) amyl orthoacetate, and neryl citronellyl ethyl orthobutyrate.

Pro-fragrances are suitably described in the following: U.S. Pat. No. 5,378,468 Suffis et al., issued Jan. 3, 1995; U.S. Pat. No. 5,626,852 Suffis et al., issued May 6, 1997; U.S. Pat. No. 5,710,122 Sivik et al., issued Jan. 20, 1998; U.S. Pat. No. 5,716,918 Sivik et al., issued Feb. 10, 1998; U.S. Pat. No. 5,721,202 Waite et al., issued Feb. 24, 1998; U.S. Pat. No. 5,744,435 Hartman et al., issued Apr. 25, 1998; U.S. Pat. No. 5,756,827 Sivik, issued May 26, 1998; U.S. Pat. No. 5,830,835 Severns et al., issued Nov. 3, 1998; U.S. Pat. No. 5,919,752 Morelli et al., issued Jul. 6, 1999 all of which are incorporated herein by reference.

Emulsifier

Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials that are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipophilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

Some suitable cleaning additives include, but are not limited to, builders, surfactants, enzymes, bleach activators, bleach catalysts, bleach boosters, bleaches, alkalinity sources, antibacterial agents, colorants, other perfumes not previously described above, other pro-perfumes not previously described above, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—$(OCH_2CH_2)_a$OH a=1 to 100, typically 12–40, R=hydrocarbon residue 8 to 20 C atoms, thypically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20 or 21 oxyethylene groups; polyoxyethylene (2), (10) oleyl ether with 2 or 10 oxyethylene groups. Comercially available examples include, but are not limited to: ALFONIC, BRIJ, GENAPOL, NEODOL, SURFONIC, TRYCOL. See also U.S. Pat. No. 6,013,683 Hill et al.

Suitable cationic surfactants include, but are not limited to dialkyldimethylammonium salts having the formula:

$$R'R''N^+(CH_3)_2X^-$$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.

Suitable silicone surfactants include, but are not limited to the polyalkyleneoxide polysiloxanes having a dimethyl polysiloxane hydrophobic moiety and one or more hydrophilic polyalkylene side chains and have the general formula:

$$R^1—(CH_3)_2SiO—[(CH_3)_2SiO]_a—[(CH_3)(R^1)SiO]_b—Si(CH_3)_1—R^1$$

wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

$$—(CH_2)_nO(C_2H_4O)_c(C_3H_6O)_dR^2$$

with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705,562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
|---|---|---|---|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—$C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactant is SF-1488, which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxyethyl)-N,N-dimethyl ammonium methylsulfate. However, it is to be understood that the term antistatic agent is not to be limited to just this subset of fabric softeners and includes all antistatic agents.

Coloring Agents:

"Coloring agents", as used herein, are any substance (including dyes and pigments) added solely for the purpose of imparting color to a composition to be used in an automatic lipophilic fluid (e.g., siloxane) laundry process, including the lipophilic fluid (e.g., siloxane solvent) wash medium composition, while being safe for contact with all fabrics in contact with the lipophilic fluid wash medium during the automatic lipophilic fluid laundry process. The safety of coloring agents for the present invention compositions and processes can be determined by contacting white fabric with potential coloring agents in an automatic lipophilic fluid laundry process, whereby coloring agents safe for use therein result in very little or no observable coloring of the white fabrics, as determined by the following test:

- white fabric swatches of various fabric content (3 of each) are used as tracers for dye transfer from the coloring agents;
- each fabric swatch is measured to determine a baseline value on the Hunter Whiteness Scale;
- measurements are performed using a spectrophotometer of choice that generates an illuminant of C/2°.
- values are recorded as Lh, ah, and bh;
- the swatches are subsequently washed and dried in the presence of the potential coloring agents(s);
- spectrophotometric measurements of the swatch tracers are taken at the end of predetermined cycles;
- differences are calculated between the initial and final cycle and recorded as delta E values;
- delta E=square root $\{(Lh_i-Lh_f)^2+(ah_i-ah_f)^2+(bh_i-bh_f)^2\}$;
- a noticeable difference for 3 or more cycyles is defined as a delta E of >=5.

It is to be recognized that coloring agents do not include those active ingredients added for purposes other than to impart color to such compositions or wash processes. For example, surfactants typically are slightly colored due to some low level of impurities; photobleaches typically give solutions a blue tint; brighteners can also provide some coloring. Thus, while the present invention compositions and processes typically include such active ingredients, the coloring agents according to the present invention are added with them, typically to mask or complement any color produced by such active ingredients.

While coloring agents generally are well known, their selection for use in the present invention processes and compositions, especially siloxane solvent systems, require careful consideration of the wash process conditions and wide range of typical fabrics which may be in contact with the coloring agent, as well as the purpose for which the coloring agent is being used. In particular, coloring agents to be used in a composition to be added to the lipophilic fluid, (e.g., siloxane solvent) during the wash process typically will be present in the composition to provide the desired aesthetics to the compositions. Such compositions typically will be added to deliver cleaning agents (e.g., surfactants, polymers, enzymes, bleaching agents) and/or fabric treatment agents (e.g., softening agents, antistatic agents, brighteners) to the wash process. The coloring agents thus provide a more consumer desirable composition, such as a blue liquid laundry detergent or a green speckled laundry powder.

Such coloring agents not only must be stable in such compositions and compatible with the other adjunct ingredients the coloring agents comes in contact with, but also must not deposit from the wash medium onto the fabrics in contact with the wash medium (i.e., they must be safe as defined by the test provided herein before). It is also highly desirable that the coloring agents used in such compositions are removable (completely or at least in major part) by the lipophilic fluid (especially a siloxane solvent) recovery system of the automatic laundry machine being used for the process (e.g., by filtration and/or distillation), and/or that the coloring agents are compatible with any coloring agent system used to color the lipophilic fluid system being used in the process, and/or the coloring agents are readily destroyed (completely or at least in major part) by other conditions utilized during the wash process. The destruction of the coloring agents may be by any means, including but not limited to chemical (e.g., oxidative and/or reductive reactions), mechanical (e.g., ultrasound), electrical, and/or thermal degradation. This includes, for example, destroying coloring agents by the use of ozone in the system, or during a heating step such as drying of the fabrics. A further consideration when selecting the coloring agent is the color compatibility with other adjunct active ingredients that provide some color.

Use of coloring agents as a colorant for the lipophilic fluid (e.g., siloxane) wash solution have similar requirements as above for the coloring agents used in the compositions added into the system—they must be at least partially stable in the wash process (to the extent necessary to provide the desired coloring of the wash medium during at least a portion of the wash process) and also must not deposit from the wash medium onto the fabrics in contact with the wash medium (i.e., they must be safe as defined by the test provided herein before). It is desirable for such coloring agents to be stable to the recycle and recovery processes employed by the automatic machine, but this is not necessary if the composition added to the wash medium with each load of laundry includes coloring agents at a level sufficient to provide the desired tinting of the wash medium or by some other replenishment process.

It is also possible to design coloring systems whereby the coloring agents used to tint the lipophilic fluid (e.g., siloxane solvent) and the coloring agents formulated into the composition added with each laundry load work cooperatively. For example, the coloring agents from the added compositions may be formulated to match the coloring agents used to tint the lipophilic fluid (e.g., siloxane solvent) system, which would be desirable to replenish lipophilic fluid-tinting colorants lost in part by the previous wash cycle(s). It is also possible to design a color system whereby the coloring agents added with the composition change the color of the lipophilic fluid (e.g., siloxane) wash medium, but are subsequently removed at some stage in the wash process (e.g., the siloxane tint undergoes a color change when the ozone treatment step is reached; the solvent changes back to the original color when the solvent recovery process is complete).

Further, it is possible to utilize coloring systems whereby the coloring agents are selectively soluble in the lipophilic fluid and/or selectively soluble in water, which may be desirable when using an aqueous emulsion (e.g., a siloxane emulsion) as the wash medium. This may be useful for easily monitoring the state of the emulsion, including the ability to observe the water and lipophilic fluid phases when the emulsion is broken.

Sudsing Agents:

The lack of natural sudsing by the lipophilic fluids (especially siloxane) wash process and cleaning systems creates the need for select systems and/or specially added ingredients to permit the generation of suds to meet the expectations of the consumer. As used herein, "sudsing agents" means any compounds and/or mixtures of compounds which when included in the lipophilic fluid (e.g., siloxane) wash medium generate observable sudsing effect during the operation of the automatic laundry machine. Sudsing agents therefore also include materials which act as suds or foam boosters, as well as select surfactants and/or emulsifiers which have sudsing properties. Properties of foams generally are very well known, having been described for example in "Additives for Foams", by Lai and Dixit, at page 315 et. Seq. of *Foams, Theory, Measurements, and Applications* (copyright 1996 by Marcel Dekker, Inc., N.Y.; Prud'homme and Khan, editors).

In particular, sudsing agents may be introduced into the lipophilic fluid wash process either by the addition of a composition containing one or more sudsing agents, such compositions typically are added to deliver cleaning agents (e.g., surfactants, polymers, enzymes, bleaching agents) and/or fabric treatment agents (e.g., softening agents, antistatic agents, brighteners) to the wash process, or by the addition of a separate sudsing agent composition (similar to the separate addition of a "rinse aide" in an automatic diswashing machine). Such sudsing agents not only must be stable in such compositions and compatible with the other adjunct ingredients the sudsing agent comes in contact with, but also must not negatively impact the fabric if it deposits from the wash medium onto the fabrics in contact with the wash medium.

It is also highly desirable that the sudsing agents are removable (completely or at least in major part) by the lipophilic fluid (e.g., siloxane solvent) recovery system of the automatic laundry machine being used for the process (e.g., by filtration and/or distillation), and/or are readily destroyed (completely or at least in major part) by other conditions utilized during the wash process. The destruction of the sudsing agents may be by any means, including but not limited to chemical (e.g., oxidative and/or reductive reactions), mechanical (e.g., ultrasound), electrical, and/or thermal degradation. This includes, for example, destroying sudsing agents by the use of ozone in the system, or during a heating step such as drying of the fabrics. Alternatively, if the sudsing agent is to be reusable after recovery of the lipophilic fluid, it is desirable for such sudsing agents to be stable to the recycle and recovery processes employed by the automatic machine. Complete stability is not necessary if the composition added to the wash medium with each load of laundry includes sudsing agents at a level sufficient to replenish the quantity of sudsing agent lost by previous wash cycles.

Careful consideration must also be given to avoiding negatively impacting the machine operations, or the ease of recycle or recovery of the lipophilic fluid (e.g., siloxane solvent), while designing the right sudsing profile to meet the consumer's needs. It is therefore necessary to consider the type of machine and process being utilized to determine the level of sudsing agent in the wash medium. For example, a process that utilizes spray jets for the dispersion of the wash medium onto the fabric is likely to generate more foaming from lower concentrations of sudsing agents than an immersive bath process that utilizes only a rotating drum for agitation of the wash medium. One of ordinary skill in the art can readily select the levels needed to match such sudsing properties to the machine and process being used.

Finally, compositions containing sudsing agents may comprise added water, either immiscible or miscible (e.g., as an emulsion) with the lipophilic fluid. Typically the water is added to the lipophilic fluid-containing wash medium (e.g., siloxane wash medium) at a level of at least about 0.1% (or at least about 0.5%, or at least about 1%) with the sudsing agents.

Methods

For the present invention process, the specific method for contacting the wash medium containing the siloxane with the fabric article may be any method which results in complete wetting of the fabric articles in the wash load by the automatic washing machine, in contrast to spot wetting and/or hand wetting of the fabric articles. This includes contacting the fabric articles in an immersive bath of the wash medium or, preferably, using lower volumes of wash medium as is possible by low volume wetting means such as spraying to uniformly wet the fabric articles. Most preferred is contacting the fabric articles using a method that comprises at least one non-immersive step whereby the fabric article is wetted with the wash medium (preferably by uniform spraying) for example only to the extent of less than about 200% (or less than about 150%) by weight of the fabric article in the wash load.

One aspect of the present invention involves the contacting of the fabric articles with a wash medium comprising less than about 50% water, more preferably less than about 30%, less than about 20%, less than about 10%, less than about 5%, less than about 1%, and most preferably no purposively added water. However, in another aspect of the present invention some amount of purposively added water is a part of the wash medium with the siloxane, including for example either immisible with the siloxane or as an emulsion comprising siloxane, water, and an emulsifying agent. Preferably the water comprises from about 0.1% to about 50%, more preferably from about 0.1% to about 30%, from about 0.1% to about 20%, from about 0.1% to about 10%, from about 0.1% to about 5%, and from about 0.1% to about 1%.

Obviously the present invention process cannot use current conventional automatic washing machines as developed for aqueous wash processes. While automatic washing machines useful for the present process may be connected to a water source, such connection for purposes of carrying out the current process is solely for the supply of the optional purposively added water. A supply of the siloxane is necessary, preferably stored in a container for use in the current process and into which the siloxane is returned (following a suitable cleaning process) after contact with the fabric articles in the automatic home laundry process.

While an apparatus having the various components as defined for the immersive commercial dry cleaning process as described in U.S. Pat. No. 6,059,845, issued May 9, 2000, and U.S. Pat. No. 6,063,135, issued May 16, 2000 (both incorporated herein by reference in their entirety), if modified for residential size and consumer maintenance, could be used to practice the present invention process, an immersive process for the present invention is not preferred. Reasons include the constraints (versus the commercial dry cleaner size and operation taught in these patents) associated with supplying, storing and cleaning larger volumes of siloxane in the home.

For these reasons lower volume processes such as those utilizing a uniform spray process which completely wets the fabric articles with the lower volumes of wash medium as described herein before are highly preferred. For example modifications of conventional low water wash appliances to deliver low levels of siloxane-containing wash medium rather than a water wash medium should be considered; such conventional water wash appliances are described for example in U.S. Pat. Nos. 4,489,574; 4,489,455; 5,191,669; 5,191,668; 5,233,718; and 5,671,494, all incorporated herein by reference in their entirety. A most preferred automatic washing machine useful for this low volume process is described in detail in the co-filed, copending patent application, P&G Case 8119P, incorporated herein by reference in its entirety. Further preferred are automatic washing machines which guarantee homogeneous coverage of the fabric articles with the siloxane-containing wash medium by intermittent spin and spray followed by random tumbling until all the wash medium has been sprayed. Also preferred are such machines which reuse the siloxane-containing wash medium via an immediate re-use/recycling action, for example by passing the wash medium over a particle removal filter after extraction from the fabric articles and then immediately spraying it back onto the fabric articles.

Further preferred automatic washing machines for practicing the present invention processes are designed to also dry the fabric articles in the same apparatus. This not only allows the consumer the convenience of not having to handle the wet fabric articles but also permits recovery of all the siloxane for reuse or cleaning.

It is also envisioned that adjuncts for cleaning and/or treating the fabric articles according to the desires of the consumer may be added to the process. The automatic washing machine therefore preferably includes recepticals for receiving and/or dispensing such adjuncts into the automatic laundry process at the desired time, either with the wash medium or separate from it. Cartridges containing such adjuncts (either through refilling or purchased with the adjunct) which releaseably attach to the machine are also optional executions. A particularly preferred adjunct is any material which functions as an antistatic agent when combined with the siloxane-containing wash medium in the present automatic home laundry process.

An additional preferred feature of the automatic washing machine is the ability to clean and reuse the siloxane for more than one automatic laundry process. A preferred means for cleaning the siloxane for multiple uses is a replaceable filter. Such filter should preferably include filter materials capable of removing and collecting at least the body soils removed from the fabric articles during the automatic home laundry process. Activated charcoal, silicas, molecular seives, and/or hydrophobically modified papers are just some optional components of such filters. The attachment to the automatic washing machine is preferably by means such that the consumer can readily replace it at regular intervals.

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

What is claimed is:

1. A fabric care composition comprising:
   a) at least about 50% by weight of composition of a lipophilic fluid selected from the group consisting of fluorinated amines, C6 or higher diols, organosilicones, polyol polyesters, and mixtures thereof; and
   b) a perfume composition comprising a lasting perfume ingredient selected from the group consisting of enduring perfume ingredients, low odor detection threshold perfume ingredients and mixtures thereof.

2. The fabric care composition according to claim 1 wherein said lipophilic fluid comprises a linear siloxane.

3. The fabric care composition according to claim 2 wherein said lipophilic fluid comprises a cyclic siloxane.

4. The fabric care composition according to claim 3 wherein said cyclic siloxane is selected from the group consisting of octamethylcyclotetrasiloxane, decamethylcyclopentasiloxane, dodecamethylcyclohexasiloxane and mixtures thereof.

5. The fabric care composition according to claim 4 wherein said cyclic siloxane comprises decamethylcyclopentasiloxane.

6. The fabric care composition according to claim 5 wherein said cyclic siloxane is substantially free of octamethylcyclotetrasiloxane.

7. The fabric care composition according to claim 6 wherein said cyclic siloxane comprises less than about 5% by weight of said decamethylcyclopentasiloxane of octamethylcyclotetrasiloxane.

8. The fabric care composition according to claim 1 wherein said perfume composition comprises an enduring perfume ingredient.

9. The fabric care composition according to claim 8 wherein said enduring perfume ingredient is selected from the group consisting of: allyl cyclohexane propionate, ambrettolide, amyl benzoate, amyl cinnamate, amyl cinnamte aldehyde, amyl cinnamic aldehyde dimethyl acetal, iso-amyl salicylate, aurantiol (trade name for hydroxycitronellal-methyl anthranilate), benzophenone, benzyl salicylate, iso-butyl quinoline, beta-caryophyllene, cadinene, cedrol, cedryl acetate, cedryl formate, cinnamyl cinnamate, cyclohexyl salicylate, cyclamen aldehyde, dihydro isojasmonate, diphenyl methane, diphenyl oxide, dodecalactone, iso E super (trade name for 1-(1,2,3,4,5,6,7,8-octahydro-2,3,8,8-tetramethyl-2-naphthalenyl)-ethanone), ethylene brassylate, ethyl methyl phenyl glycidate, ethyl undecylenate, iso-eugenol, exaltolide (trade name for 15-hydroxypentadecanoic acid, lactone), galaxolide (trade name for 1,3,4,6,7,8-hexahydro-4,6,6,7,8,8-hexamethylcyclopenta-gamma-2-benzopyran), geranyl anthranilate, hexadecanolide, hexenyl salicylate, hexyl cinnamic aldehyde, hexyl salicylate, lilial (trade name for para-tertiary-butyl-alpha-methyl hydrocinnamic aldehyde), linalyl benzoate, 2-methoxy naphthalene, methyl cinnamate, methyl dihydrojasmonate, beta-methyl naphthyl ketone, musk indanone, musk ketone, musk tibetine, myristicin, delta-nonalactone, oxahexadecanolide-10, oxahexadecanolide-11, patchouli alcohol, phantolide (trade name for 5-acetyl-1,1,2,3,3,6-hexamethylindan), phenyl ethyl benzoate, phenylethylphenylacetate, phenyl heptanol, phenyl hexanol, alpha-santalol, thibetolide (trade name for 15-hydroxypentadecanoic acid, lactone), tonalid, delta-undecalactone, gamma-undecalactone, vetiveryl acetate, yara-yara, allyl phenoxy acetate, cinnamic alcohol, cinnamic aldehyde, cinnamyl formate, coumarin, dimethyl benzyl carbinyl acetate, ethyl cinnamate, ethyl vanillin (3-methoxy-4-ethoxy benzaldehyde), eugenol, eugenyl acetate, heliotropine, indol, isoeugenol, koavone, methyl-beta-naphthyl ketone, methyl cinnamate, methyl dihydrojasmonate, beta methyl naphthyl ketone, methyl-n-methyl anthranilate, delta-nonalactone, gamma-nonalactone, para methoxy acetophenone (acetanisole), phenoxy ethyl iso butyrate, phenoxy ethyl propionate, piperonal, triethyl citrate, vanillin, methyl-N-methyl anthranilate, benzyl butyrate, benzyl iso valerate, citronellyl isobutyrate, citronellyl propionate, delta-nonalactone, dimethyl benzyl carbinyl acetate, dodecanal, geranyl acetate, geranyl isobutyrate, gamma-ionone, para-isopropyl phenylacetaldehyde, cis-jasmone, methyl eugenol, hydroxycitronellal, phenoxy ethanol, benzyl iso valerate, anisic aldehyde, cuminic alcohol, cis-jasmone, methyl eugenol and mixtures thereof.

10. The fabric care composition according to claim 8 wherein said enduring perfume ingredient has a boiling point of about 240°0 C. or higher.

11. The fabric care composition according to claim 10 wherein said enduring perfume ingredient has a boiling point of about 250° C. or higher.

12. The fabric care composition according to claim 1 wherein said perfume composition comprises a low odor detection threshold perfume ingredient.

13. The fabric care composition according to claim 12 wherein said low odor detection threshold perfume ingredient is selected from the group consisting of: allyl amyl glycolate, ambrox, anethole, bacdanol, benzyl acetone, benzyl salicylate, butyl anthranilate, calone, cetalox, cinnamic alcohol, coumarin, cyclogalbanate, Cyclal C, cymal, damascenone, alpha-damascone, 4-decenal, dihydro isojasmonate, gamma-dodecalactone, ebanol, ethyl anthranilate, ethyl-2-methyl butyrate, ethyl methylphenyl glycidate, ethyl vanillin, eugenol, flor acetate, florhydral, fructone, frutene, heliotropin, herbavert, cis-3-hexenyl salicylate, indole, alpha-ionone, beta-ionone, iso cyclo citral, isoeugenol, alpha-isomethylionone, keone, lilial, linalool, lyral, methyl anthranilate, methyl dihydrojasmonate, methyl heptine carbonate, methyl isobutenyl tetrahydropyran, methyl beta naphthyl ketone, methyl nonyl ketone, beta naphthol methyl ether, nerol, para-anisic aldehyde, para hydroxy phenyl butanone, phenyl acetaldehyde, gamma-undecalactone, undecylenic aldehyde and mixtures thereof.

14. The fabric care composition according to claim 1 wherein said fabric care composition comprises from about 0.01% to about 5% by weight of the composition, of said perfume composition.

15. The fabric care composition according to claim 14 wherein said fabric care composition comprises from about 0.1% to about 4% by weight of the composition, of said perfume composition.

16. The fabric care composition according to claim 15 wherein said fabric care composition comprises from about 0.3% to about 3% by weight of the composition, of said perfume composition.

17. The fabric care composition according to claim 16 wherein said fabric care composition comprises from about 0.4% to about 2% by weight of the composition, of said perfume composition.

18. The fabric care composition according to claim 1 wherein said perfume composition comprises at least about 25% by weight of the perfume composition of said lasting perfume ingredient.

19. The fabric care composition according to claim 18 wherein said perfume composition comprises at least about 40% by weight of the perfume composition of said lasting perfume ingredient.

20. The fabric care composition according to claim 19 wherein said perfume composition comprises at least about 60% by weight of the perfume composition of said lasting perfume ingredient.

21. The fabric care composition according to claim 20 wherein said perfume composition comprises at least about 75% by weight of the perfume composition of said lasting perfume ingredient.

22. The fabric care composition according to claim 1 wherein said composition comprises from about 0.0001% to about 0.2% by weight of the composition, of said perfume composition.

23. The fabric care composition according to claim 22 wherein said composition comprises from about 0.0002% to about 0.1% by weight of the composition, of said perfume composition.

24. The fabric care composition according to claim 23 wherein said composition comprises from about 0.003% to about 0.08% by weight of the composition, of said perfume composition.

25. The fabric care composition according to claim 24 wherein said composition comprises from about 0.005% to about 0.05% by weight of the composition, of said perfume composition.

26. The fabric care composition according to claim 1 wherein said composition comprises from about 50% to about 100% by weight of the composition of said lipophilic fluid.

27. The fabric care composition according to claim 1 wherein said composition further comprises water.

28. The fabric care composition according to claim 27 wherein said composition comprises less than about 50% by weight of the composition of water.

29. The fabric care composition according to claim 28 wherein said composition comprises from about 0.1% to about 50% by weight of the composition of water.

30. The fabric care composition according to claim 1 wherein said composition further comprises an emulsifier.

31. A fabric care composition comprising:
 a) at least 50% by weight of the composition of a lipophilic fluid selected from the group consisting of fluorinated amines, C6 or higher diols, organosilicones, polyol polyesters, and mixtures thereof;
 b) a perfume composition comprising a lasting perfume ingredient selected from the group consisting of enduring perfume ingredients, low odor detection threshold perfume ingredients and mixtures thereof;
 c) an emulsifier; and
 d) water.

32. A method for treating a fabric in need of treatment comprising contacting said fabric with a fabric care composition according to claim 1 such that the fabric is treated.

33. A method for delivering a perfume composition to a fabric comprising contacting said fabric with a fabric care composition according to claim 1 such that an effective amount of said perfume composition is delivered to said fabric.

34. A fabric treated by the method according to claim 32.

35. A perfumed fabric produced by the method according to claim 33.

36. The fabric of claim 35 wherein said fabric comprises from about 0.1 µm to about 5000 µm of perfume per gram of fabric.

37. A perfume delivery system comprising:
 a) at least 50% by weight of the composition of a lipophilic fluid selected from the group consisting of fluorinated amines, C6 or higher diols, organosilicones, polyol polyesters, and mixtures thereof; and
 b) a perfume composition comprising a lasting perfume ingredient selected from the group consisting of enduring perfume ingredients, low odor detection threshold perfume ingredients and mixtures thereof;

wherein said perfume composition is delivered to a fabric upon contacting said fabric.

38. An article of manufacture comprising a fabric care composition according to claim 1 packaged in association with instructions for using said fabric care composition for treating a fabric in need of treatment comprising the step of contacting said fabric with said fabric care composition.

39. The fabric of claim 35 wherein said fabric is made of fibers selected from the group consisting of natural fibers, synthetic fibers and mixtures thereof.

40. The fabric of claim 35 wherein said fabric is made of fibers selected from the group consisting of cellulosic fibers, proteinaceous fibers, synthetic fibers, long vegetable fibers and mixtures thereof.

41. The fabric of claim 40 wherein said cellulosic fibers are selected from the group consisting of cotton, rayon, linen, Tencel®, poly/cotton and mixtures thereof; wherein said proteinaceous fibers are selected from the group consisting of silk, wool and related mammalian fibers and mixtures thereof; wherein said synthetic fibers are selected from the group consisting of polyester, acrylic, nylon and mixtures thereof; and wherein said long vegetable fibers are selected from the group consisting of jute, flax, ramie, coir, kapok, sisal, henequen, abaca, hemp, sunn and mixtures thereof.

42. The fabric of claim 35 wherein said fabric is selected from the group consisting of cotton, rayon, linen, polyester/cotton blends, silk, wool, polyester, acrylic, nylon, and mixtures thereof.

43. The method according to claim 32 comprising the step of contracting the fabric article in need of treatment with a vapor phase comprising the perfume composition.

44. The method according to claim 32 comprising the step of contacting the fabric article in need of treatment with a fabric care composition such that the perfume composition therein is applied to the fabric article when the fabric care composition is placed in a stream of impinging gas.

* * * * *